United States Patent
Kamihara

(10) Patent No.: US 10,609,251 B2
(45) Date of Patent: Mar. 31, 2020

(54) IMAGE FORMING APPARATUS PRIORITIZING GRADATION CORRECTION DATA BASED ON RECORDING MEDIUM CHARACTERISTICS OR IMAGE FORMED

(71) Applicant: Kazuaki Kamihara, Tokyo (JP)

(72) Inventor: Kazuaki Kamihara, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/407,843

(22) Filed: May 9, 2019

(65) Prior Publication Data

US 2020/0007711 A1 Jan. 2, 2020

(30) Foreign Application Priority Data

Jun. 27, 2018 (JP) ................................. 2018-121724

(51) Int. Cl.
*H04N 1/407* (2006.01)
*G06K 15/14* (2006.01)
(Continued)

(52) U.S. Cl.
CPC ....... *H04N 1/4072* (2013.01); *G03G 15/0105* (2013.01); *G03G 15/5054* (2013.01); *G03G 15/5062* (2013.01); *G06K 15/14* (2013.01); *G06K 15/1822* (2013.01); *G06K 15/1872* (2013.01); *H04N 1/00005* (2013.01); *H04N 1/00015* (2013.01); *H04N 1/00034* (2013.01); *H04N 1/00068* (2013.01); *H04N 1/00082* (2013.01); *H04N 1/6027* (2013.01); *H04N 1/6044* (2013.01)

(58) Field of Classification Search
None
See application file for complete search history.

(56) References Cited

U.S. PATENT DOCUMENTS

| 6,044,234 A * | 3/2000 | Yoshizawa | G03G 15/0147 399/308 |
| 7,306,313 B2 * | 12/2007 | Kamimura | H04N 1/58 347/116 |

(Continued)

FOREIGN PATENT DOCUMENTS

| JP | 2006-053385 | 2/2006 |
| JP | 2012-042924 | 3/2012 |
| JP | 2017-073750 | 4/2017 |

*Primary Examiner* — Scott A Rogers
(74) *Attorney, Agent, or Firm* — Oblon, McClelland, Maier & Neustadt, L.L.P.

(57) ABSTRACT

An image forming apparatus includes a transferor, a first detector to detect an image formed on the transferor, a second detector to detect an image formed on a recording medium, and circuitry. The circuitry is configured to generate first gradation correction data based on a detection result obtained by the first detector, generate second gradation correction data based on a detection result obtained by the second detector, and control gradation correction for the image formed on the recording medium using the first and second gradation correction data. Further, the circuitry is configured to prioritize one of the first and second gradation correction data based on at least one of a characteristic of the recording medium and a characteristic of the image in the gradation correction during consecutive printing in which images are consecutively formed on recording media.

5 Claims, 14 Drawing Sheets

(51) Int. Cl.
  *G06K 15/02* (2006.01)
  *G03G 15/01* (2006.01)
  *G03G 15/00* (2006.01)
  *H04N 1/00* (2006.01)
  *H04N 1/60* (2006.01)

(56) References Cited

U.S. PATENT DOCUMENTS

| | | |
|---|---|---|
| 9,910,394 B2 * | 3/2018 | Nakase ................. H04N 1/024 |
| 10,061,226 B2 * | 8/2018 | Kamihara ............. G03G 15/556 |
| 10,389,888 B2 * | 8/2019 | Tomii ................. H04N 1/00023 |
| 2011/0211854 A1 | 9/2011 | Shiori et al. |
| 2012/0019844 A1 | 1/2012 | Tonami et al. |
| 2012/0045235 A1 | 2/2012 | Shiori et al. |
| 2012/0093528 A1 | 4/2012 | Shiori et al. |
| 2012/0114358 A1 | 5/2012 | Sugiyama et al. |
| 2012/0177406 A1 | 7/2012 | Suzuki et al. |
| 2012/0230711 A1 | 9/2012 | Shiori et al. |
| 2012/0315060 A1 | 12/2012 | Sugiyama et al. |
| 2014/0064756 A1 | 3/2014 | Sugiyama et al. |
| 2015/0160599 A1 | 6/2015 | Kamihara et al. |
| 2016/0004192 A1 | 1/2016 | Itoh et al. |
| 2016/0026109 A1 | 1/2016 | Nakayama et al. |
| 2016/0147174 A1 | 5/2016 | Yasuda et al. |
| 2016/0252864 A1 | 9/2016 | Kamihara et al. |
| 2016/0291507 A1 | 10/2016 | Nakayama et al. |
| 2017/0315471 A1 | 11/2017 | Kamihara et al. |
| 2018/0143581 A1 | 5/2018 | Nakayama et al. |
| 2018/0150010 A1 | 5/2018 | Sone et al. |
| 2019/0064719 A1 | 2/2019 | Tachi et al. |

\* cited by examiner

IMAGE FORMING APPARATUS PRIORITIZING GRADATION CORRECTION DATA BASED ON RECORDING MEDIUM CHARACTERISTICS OR IMAGE FORMED

CROSS-REFERENCE TO RELATED APPLICATION

This patent application is based on and claims priority pursuant to 35 U.S.C. § 119(a) to Japanese Patent Application No. 2018-121724, filed on Jun. 27, 2018, in the Japan Patent Office, the entire disclosure of which is hereby incorporated by reference herein.

BACKGROUND

Technical Field

Embodiments of the present disclosure relate to an image forming apparatus.

Description of the Related Art

Electrophotographic image forming apparatuses that form images on recording media employ techniques to stabilize characteristics of image formation and output. For example, these apparatuses form a gradation correction pattern having a certain gradation value, gradation correction data is generated based on detection results of the gradation correction pattern obtained by a sensor, and a multi-tone image to be output is corrected by the gradation correction data.

SUMMARY

Embodiments of the present disclosure describe an improved image forming apparatus that includes a transferor, a first detector to detect an image formed on the transferor, a second detector to detect an image formed on a recording medium, and circuitry. The circuitry is configured to generate first gradation correction data based on a detection result obtained by the first detector, generate second gradation correction data based on a detection result obtained by the second detector, and control gradation correction for the image formed on the recording medium using the first and second gradation correction data. Further, the circuitry is configured to prioritize one of the first and second gradation correction data based on at least one of a characteristic of the recording medium and a characteristic of the image in the gradation correction during consecutive printing in which images are consecutively formed on recording media.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
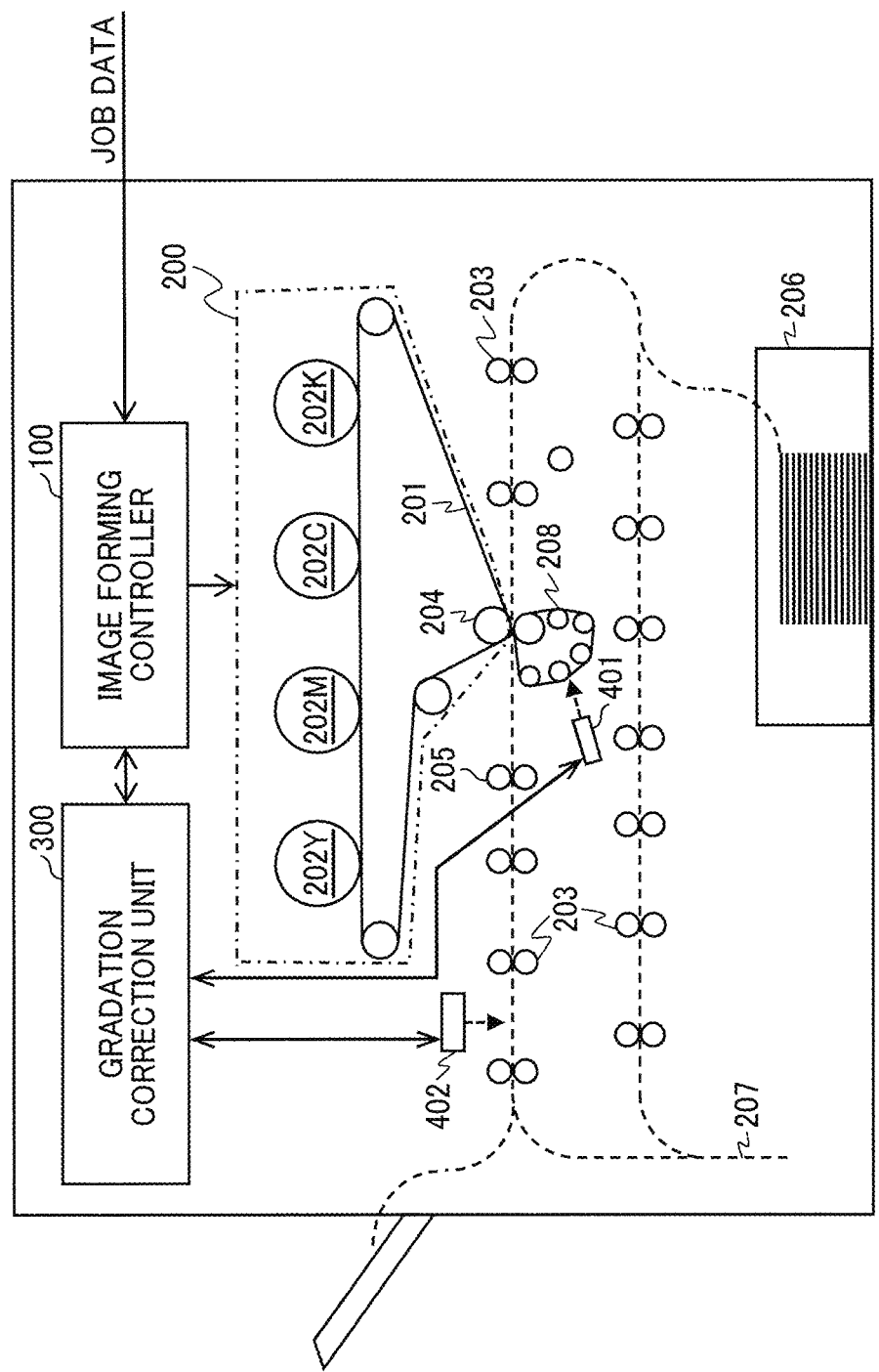
FIG. 1 is a schematic view illustrating a configuration of a printer as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

There are several methods for controlling gradation correction. For example, one method involves detecting a test pattern (a patch image) formed on an image bearer by a sensor and executing gradation correction control using the detection result of the test pattern. A second method involves forming an image on a recording medium, detecting the image on the recording medium, and executing gradation correction control using the detection result of the image.

The first method has the advantage that data for the gradation correction control is stably acquired independently of characteristics of the images formed in consecutive image formation operations. On the other hand, an interval between successive images formed on the recording media is required to form the test pattern on the image bearer. Accordingly, the first method is deficient in that the frequency of forming the test pattern (frequency of detection) is not increased in order not to degrade productivity.

In the second method, data for the gradation correction control (i.e., gradation correction data) depends on the characteristics of the formed image. In particular, if the image includes various tones (colors), the gradation correction data that can be adapted to gradation changes with high frequency and high accuracy. On the other hand, if images including few tones (colors) are consecutively formed, data indicating the gradation change decreases, the quality of the gradation correction data is lowered, and it is difficult to execute the gradation correction control with high accuracy. That is, the second method suffers from the fact that the quality of the gradation correction control depends on the characteristics of the formed image.

Thus, it is desirable to use the two gradation correction control methods described above in combination and to properly execute the gradation correction control according to the characteristic of the image in the consecutive image formation operations.

In the image forming apparatus according to the present disclosure, when consecutive image formation operations are performed, two types of gradation correction data that derive from different origins are applied to the gradation correction control during the consecutive image formation operations. For example, in the gradation correction control using the two types of gradation correction data, even if one gradation correction data changes, the other type of gradation correction data is adjusted to cancel the change. Therefore, a change in color between images of the consecutive image formation operations is reduced by the control.

The one gradation correction data derives from a detection result of a pattern image formed on an image bearer employed in the electrophotographic image formation. A sensor detects an amount of toner, which form the pattern image, adhering to the image bearer, and a gradation correction amount detected on a belt is generated based on the detection result. The gradation correction data detected on the belt is referred to as first gradation correction data. Generating the first gradation correction data is referred to as first gradation correction.

The other gradation correction data derives from a result of comparing a user image formed on the recording medium (e.g., a sheet) and image data used to form the user image. A sensor reads the user image formed on the recording medium, and the detection data of the user image as the reading result by the sensor is compared with the image data as comparative criteria, thereby generating a gradation correction amount detected on the sheet. The gradation correction data detected on the sheet is referred to as second gradation correction data. Generating the second gradation correction data is referred to as the second gradation correction.

In the image forming apparatus according to the present disclosure, even when a job (a print job) to perform image formation is a print job that can generate valid second gradation correction data (i.e., a valid print job), the first gradation correction is still executed at a predetermined timing, thereby updating the first gradation correction data.

In the image forming apparatus according to the present disclosure, process control processing is periodically performed at predetermined times to stabilize an image density over a long period regardless of environmental changes. At that time, when the first gradation correction is executed, the first gradation correction data is updated, and the second gradation correction data is reset (i.e., no correction). Then, the gradation correction control is executed.

Therefore, according to the present disclosure, in the gradation correction control when valid print jobs are consecutively performed, the gradation correction data reflecting only the second gradation correction data can be used, thereby improving accuracy of the gradation correction control. When a print job other than a valid print job is performed, the gradation correction control switches to the first gradation correction, and the second gradation correction takes over the result reflecting the updated first gradation correction. As a result, in the gradation correction control executed with the gradation correction data deriving from different origins, during consecutive image formation operations, no color change occurs due to switching of the correction control method. Thus, the first gradation correction reduces color change including change caused by the process control processing.

Note that "a print job that can generate valid second gradation correction data (i.e., a valid print job)" is a print job including various colors in image data (user image data) used in image formation and using a recording medium with a thickness such that an image on a reverse side is not recognized from the obverse side when images are formed on both sides of the recording medium. That is, the print job uses the recording medium with the thickness such that the sensor can normally detect the image. Note that "including various colors" means that the image data of the print job includes: all colors of black (K), cyan (C), magenta (M), and yellow (Y); and low tone (high light) and high tone (shadow) of the all colors.

"Process control processing" means that an optical detector detects a toner adhesion amount of a pattern image formed on an image bearer, and image forming conditions, such as charging bias, developing bias, and an exposure of an exposure device, are controlled to stabilize an image density in an electrophotographic image forming apparatus. For example, with yellow (Y), cyan (C), magenta (M), and black (K) toners, respective color patch patterns including multiple patch toner images with respective colors are formed and transferred to the image bearer so as not to overlap. The optical sensor detects the toner adhesion amount of toner images of the respective color patch patterns. Then, image forming conditions, such as developing bias reference values of image forming units to form respective color images, are individually adjusted based on the detection results.

The following descriptions are given of a printer 1 as an image forming apparatus according to an embodiment of the present disclosure with reference to the drawings. FIG. 1 is a schematic diagram illustrating a configuration of the printer 1 according to the present embodiment. As illustrated in FIG. 1, the printer 1 includes an image forming controller 100, an image forming device 200, a gradation correction unit 300, a first detector 401, and a second detector 402.

The printer 1 is a digital image forming apparatus. In the printer 1, the image forming controller 100 receives image data to be printed out, which is an output image, based on job data received from an external device and generates bitmap data. The image forming controller 100 applies gradation correction data generated by the gradation correction unit 300 to the bitmap data and controls the image forming device 200 with the bitmap data.

The image forming device 200 forms a user image on a recording medium based on image data included in the job data and ejects the recording medium by control of the image forming controller 100. The image forming device 200 includes a conveyance belt 201 as an intermediate transferor, an image bearer, and an endless belt, photoconductor drums 202Y, 202M, 202C, and 202K for respective colors (hereinafter, also collectively referred to as the photoconductor drums 202) arranged along the conveyance belt 201. Such an image forming apparatus having the above-described configuration is called a tandem-type image forming apparatus. The photoconductor drums 202Y, 202M, 202C, and 202K are disposed in the order from the upstream side of a conveyance direction of the conveyance belt 201 as an intermediate transfer belt.

Respective color toner images formed on the photoconductor drums 202 are transferred and superimposed onto the conveyance belt 201, thereby forming a full-color toner image. In FIG. 1, broken lines represent a conveyance route of sheets. At a transfer position where the conveyance belt 201 is closest to a sheet fed from a sheet feeding tray 206 and conveyed along the broken lines by conveyance roller pairs 203, the full-color toner image is transferred by a transfer roller 204 from the conveyance belt 201 onto the sheet.

The sheet on which the image is formed is conveyed to a fixing roller 205, and the image is fixed on the sheet by the fixing roller 205. Then, the sheet is ejected outside the printer 1 by the conveyance roller pairs 203 disposed along the conveyance route. In duplex printing, after the image is fixed on one side of the sheet, the sheet is conveyed to a reversal path 207, turned upside down, and conveyed again to the transfer position opposed to the transfer roller 204.

The secondary transfer belt 208 serving as a belt, a transferor, and an image bearer is disposed outside and below the loop of the conveyance belt 201. The secondary transfer belt 208 is biased toward the conveyance belt 201. Thus, the secondary transfer belt 208 is pressed against the conveyance belt 201.

The pattern image for generating the first gradation correction data is transferred from the conveyance belt 201 to the secondary transfer belt 208. That is, the pattern image is formed on the secondary transfer belt 208. The first detector 401 detects a toner adhesion amount of the pattern image formed on the secondary transfer belt 208. The first detector 401 is an optical sensor in which a light emitting element irradiates the secondary transfer belt 208 with light, and a light receiving element receives the reflected light from the secondary transfer belt 208. Thus, the first detector 401 detects the pattern image including multiple tone images and outputs the toner adhesion amount on the secondary transfer belt 208. The first detector 401 is disposed, for example, downstream from the secondary transfer belt 208 in the conveyance route of sheets. A position of the first detector 401 is not limited to the example in FIG. 1. The first detector 401 may be disposed to detect a pattern image on the conveyance belt 201 as a transferor and an image bearer. For example, the first detector 401 may be disposed downstream from the photoconductor drum 202K in the conveyance direction of the conveyance belt 201.

A second detector 402 is a line sensor that scans a surface of the sheet conveyed through the conveyance route, reads a user image formed on the surface of the sheet, and outputs the detection data of the user image. The second detector 402 is disposed, for example, downstream from the fixing roller 205 in a conveyance direction of the sheet through the conveyance route.

In the example in FIG. 1, the second detector 402 is provided to read only one side of the sheet conveyed through the conveyance route. Alternatively, the second detectors 402 may be disposed on both sides of the sheet to detect both sides of the sheet.

Figure 2:
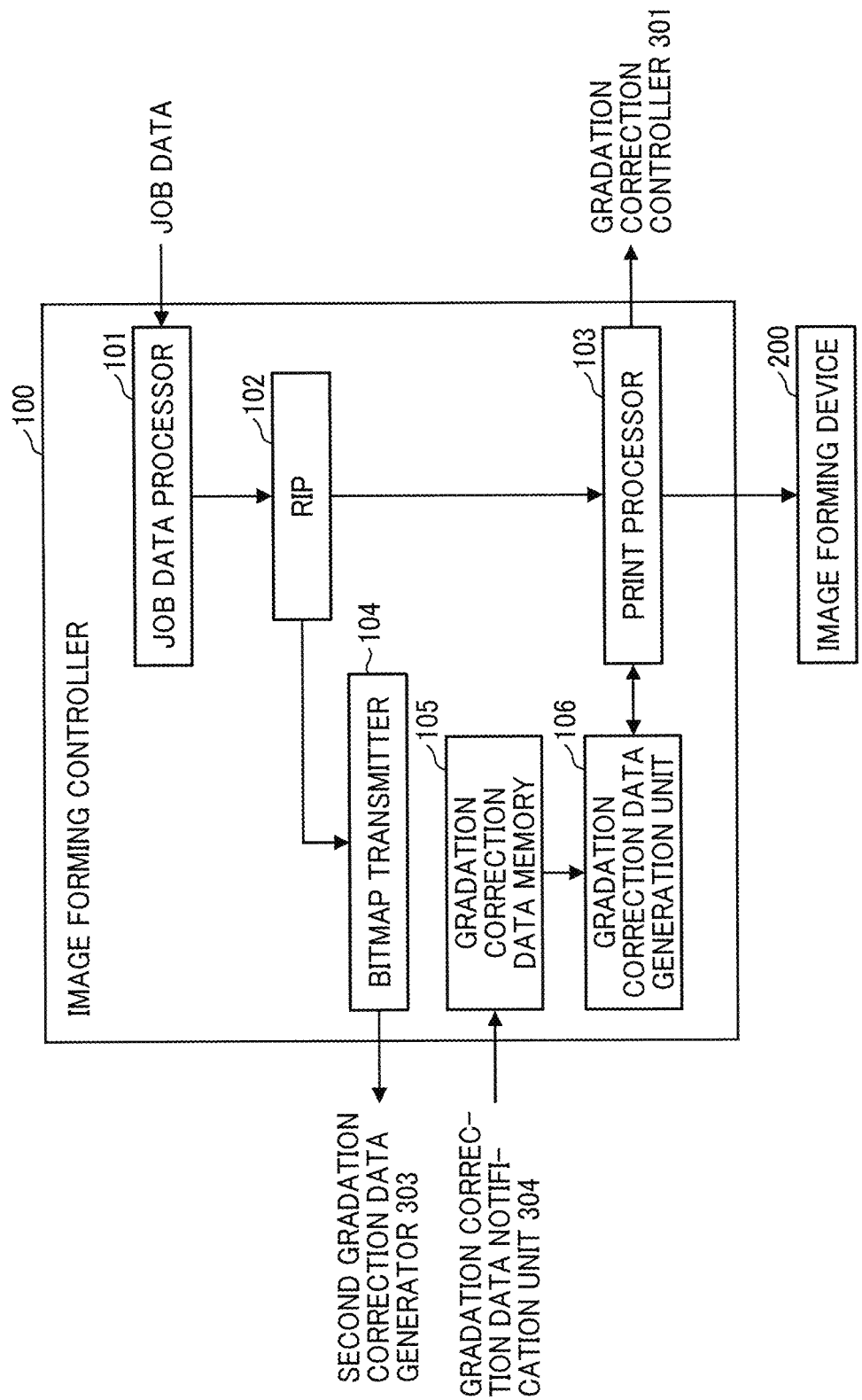
FIG. 2 is a block diagram of an image forming controller included in the printer in FIG. 1.

Next, a configuration of the image forming controller 100 is described with reference to FIG. 2. The image forming controller 100 includes a job data processor 101, a raster image processor (RIP) 102, a print processor 103, a bitmap transmitter 104, a gradation correction data memory 105, and a gradation correction data generation unit 106.

The job data processor 101 controls the image formation and output based on a print job input from the outside via a network or a print job generated from image data stored in the printer 1 by an operator. When image formation and output are performed, the job data processor 101 causes the RIP 102 to generate bitmap data based on the image data included in the print job.

The job data processor 101 controls the RIP 102 to generate the bitmap data to form and output images with the print processor 103 based on the image data included in the print job. The bitmap data includes information of each of pixels constructing an image to be formed and output. Further, the RIP 102 converts the image data included in the print job from a multi value image to a small value image, generates binary bitmap data of cyan, magenta, yellow, and black (CMYK), and transmits the bitmap data to the print processor 103.

The print processor 103 applies the gradation correction data from the gradation correction data generation unit 106 to the binary images of CMYK and forms and outputs images. In consecutive image formation operations, the print processor 103 notifies the gradation correction unit 300 (the gradation correction controller 301) of such things as the number of pages, a sheet thickness (basis weight), and a sheet size (length).

The bitmap transmitter 104 transmits the bitmap data generated by the RIP 102 to the gradation correction unit 300 (the second gradation correction data generator 303) to generate a master image.

The print processor 103 acquires the gradation correction data from the gradation correction data generation unit 106 and executes gradation correction that applies the gradation correction data to the bitmap (raster image) data input from RIP 102. The print processor 103 transfers the bitmap data on which the gradation correction is executed to the image forming device 200 to form and output an image on a recording medium (e.g., a sheet). As described above, the recording medium on which the image is formed by the image forming device 200 is conveyed through the conveyance route and ejected outside the printer 1.

The gradation correction data memory 105 sorts and stores the gradation correction data notified from the gradation correction unit 300 (a gradation correction data notification unit 304). That is, the gradation correction data memory 105 stores the gradation correction data so as to retain a history of the first gradation correction data and the second gradation correction data notified in the past.

When the print processor 103 forms and outputs images, the gradation correction data generation unit 106 reads out the gradation correction data that meets a predetermined condition relative to the bitmap data notified from RTP 102, from the gradation correction data memory 105 and notifies the print processor 103.

Figure 3:
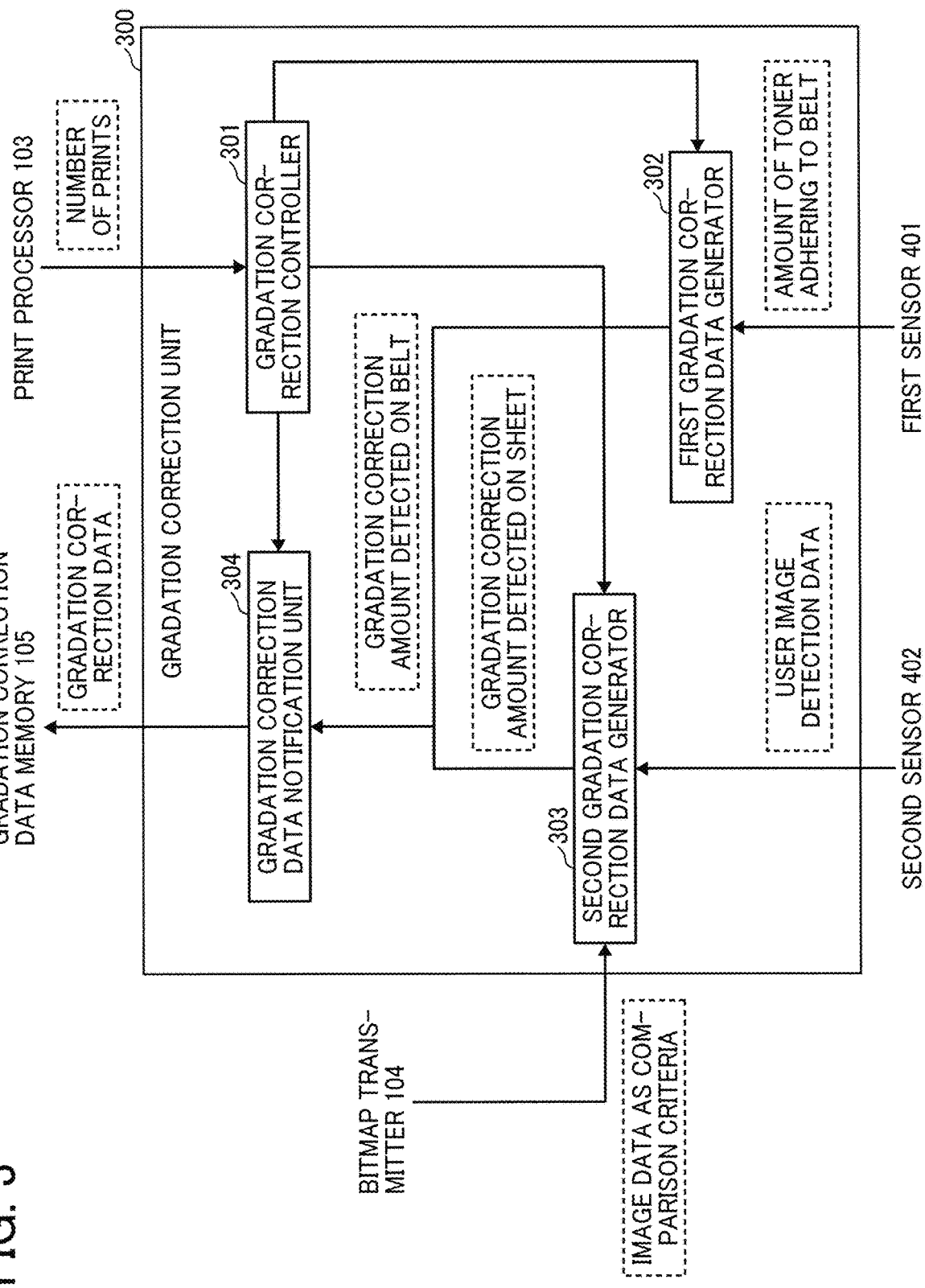
FIG. 3 is a block diagram illustrating a configuration of a gradation correction unit included in the printer in FIG. 1.

Next, a configuration of the gradation correction unit 300 is described with reference to FIG. 3. The gradation correction unit 300 includes a gradation correction controller 301, a first gradation correction data generator 302, a second gradation correction data generator 303, and a gradation correction data notification unit 304.

The gradation correction controller 301 controls when to generate the gradation correction data by each of the first gradation correction data generator 302 and the second gradation correction data generator 303 based on the number of processing (e.g., the number of consecutive print pages and the number of cumulative print pages) in the consecutive image formation operations notified from the print processor 103. The gradation correction controller 301 causes the gradation correction data notification unit 304 to notify the gradation correction data memory 105 of the first gradation correction data and the second gradation correction data.

The gradation correction controller 301 causes the first gradation correction data generator 302 to generate the first gradation correction data based on the toner adhesion amount read by the first detector 401 and notifies the gradation correction data notification unit 304.

The gradation correction controller 301 causes the second gradation correction data generator 303 to generate the second gradation correction data based on the user image read by the second detector 402. Because the user image read by the second detector 402 is generated by scanning the surface of the sheet that is an output of the image formation operation, the user image is an image representing an output result.

As described above, the second gradation correction data generator 303 acquires the bitmap data from the image forming controller 100 and generates the master image as a benchmark image to compare with the user image described above. The second gradation correction data generator 303 compares the user image acquired from the bitmap transmitter 104 and the master image. Based on the comparison, the second gradation correction data generator 303 generates the second gradation correction data and notifies the gradation correction data notification unit 304.

The gradation correction controller 301 causes the gradation correction data notification unit 304 to store the first gradation correction data and the second gradation correction data in the gradation correction data memory 105.

Figure 4:
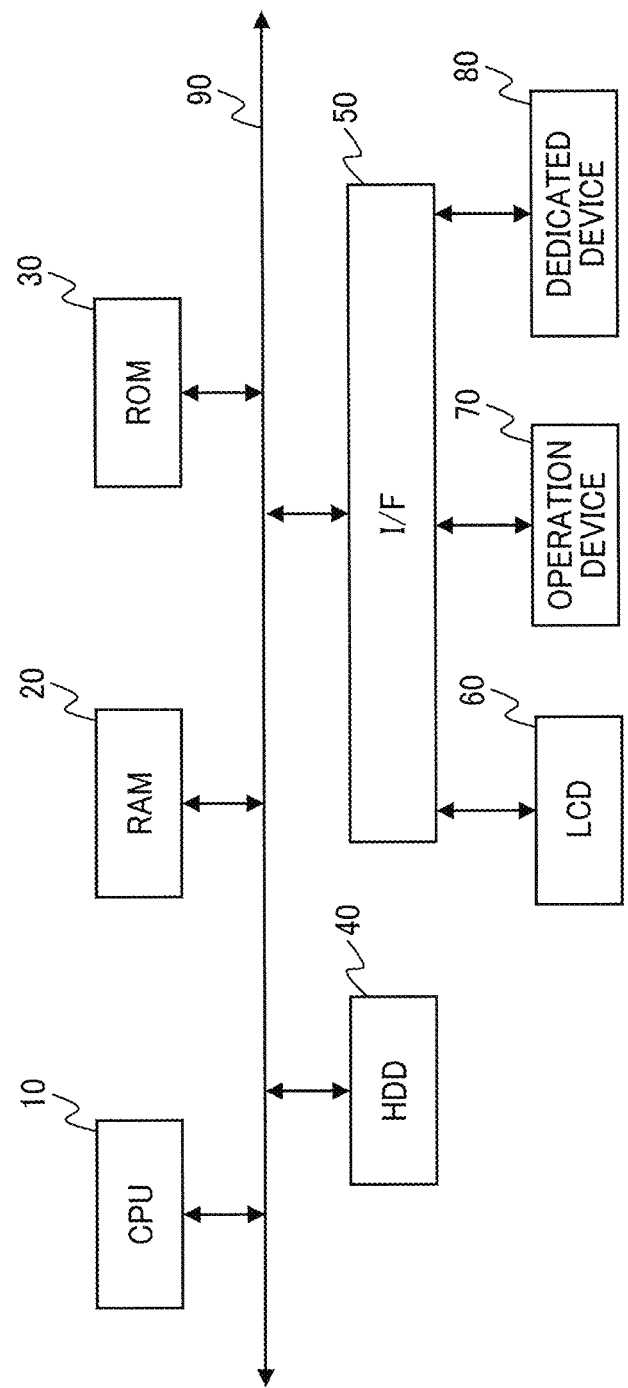
FIG. 4 is a block diagram illustrating a hardware configuration of the printer in FIG. 1.

Here, a description is given of hardware constructing a control system included in the printer 1 according to the present embodiment with reference to FIG. 4. As illustrated in FIG. 4, the printer 1 according to the present embodiment includes a configuration similar to that of typical data processing devices such as personal computers (PC) and servers. In other words, a central processing unit (CPU) 10, a random access memory (RAM) 20, a read only memory (ROM) 30, a hard disk drive (HDD) 40, and an interface (I/F) 50 are connected to each other via a bus 90 in the printer 1 according to the present embodiment. The I/F 50 is connected to a liquid crystal display (LCD) 60, an operation device 70, and a dedicated device 80.

The CPU 10 is a computation device and controls operations of the entire printer 1. The RAM 20 is a volatile storage medium in which data is read and written at high speed and used as a working area when the CPU 10 processes data. The ROM 30 is a non-volatile read only storage medium and stores programs such as firmware. The HDD 40 is a non-volatile storage medium, in which data is read and written, and stores an operating system (OS), various control programs, application programs, and the like.

The I/F 50 connects the bus 90 to various hardware components or networks for control. The LCD 60 is a visual user interface for users to confirm the state of the printer 1.

The operation device 70 is a user interface, such as a key board and a mouse, for users to input data to the printer 1.

The dedicated device 80 is a hardware device that implements special functions in the image forming controller 100 and the gradation correction unit 300. In the case of the image forming controller 100, the dedicated device 80 is a conveyance mechanism that conveys a sheet onto which an image is to be formed and output, or a plotter that forms and outputs an image on the surface of the sheet. In the case of the gradation correction unit 300, the dedicated device 80 is a computation device that performs high speed image processing. Such a computation device is configured as, for example, an application specific integrated circuit (ASIC).

In such a hardware configuration, the CPU 10 performs calculation according to a program stored in the ROM 30 or a program loaded into the RAM 20 from a storage medium, such as the HDD 40 or an optical disc, thereby constituting a software control unit. A combination of the software control unit thus constructed and the hardware constructs functional blocks that implement functions of the printer 1 according to the present embodiment.

Figure 5:
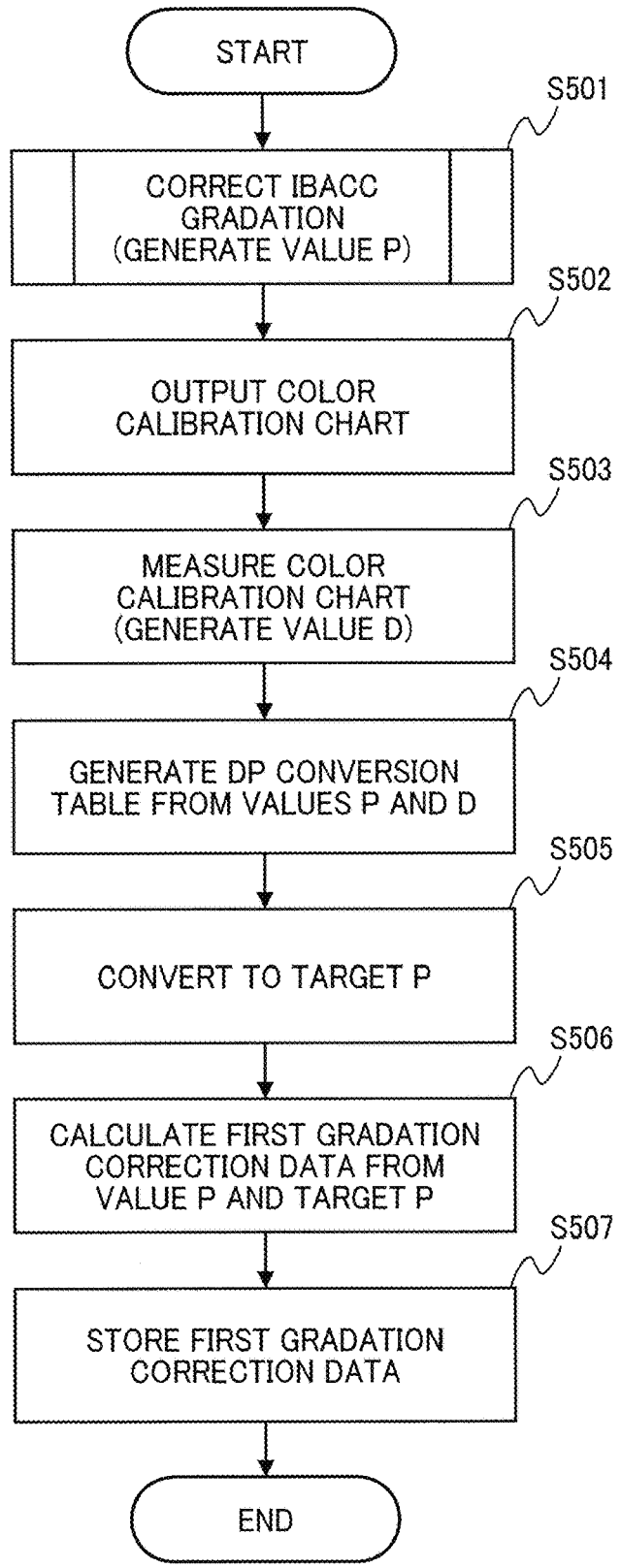
FIG. 5 is a flowchart illustrating a colorimetry calibration procedure executed by the printer in FIG. 1.

Next, a description is given of colorimetry calibration to generate an initial gradation correction amount before consecutive image formation operations using the printer 1. FIG. 5 is a flowchart illustrating processing of colorimetry calibration.

First, the gradation correction unit 300 acquires first gradation correction data (Value P) by the first gradation correction executed at the time of process control processing (step S501). Subsequently, the image forming device 200 outputs a color calibration chart (step S502). The gradation correction unit 300 measures the color calibration chart and generates the measured result (Value D) (step S503).

Since Value D and Value P indicate the same characteristic, the gradation correction unit 300 generates a DP conversion table indicating correlation between color (image density) and a detection result by the first gradation correction, based on both Value D and Value P (step S504). Using the DP conversion table, the gradation correction unit 300 converts a density target value of the color calibration chart (Target D) to a target value of the detection result by the first gradation correction (step S505).

Subsequently, the gradation correction unit 300 calculates the first gradation correction data from Value P and Target P (step S506) and stores the first gradation correction data in the gradation correction data memory 105 as criteria (step S507).

Figure 6:
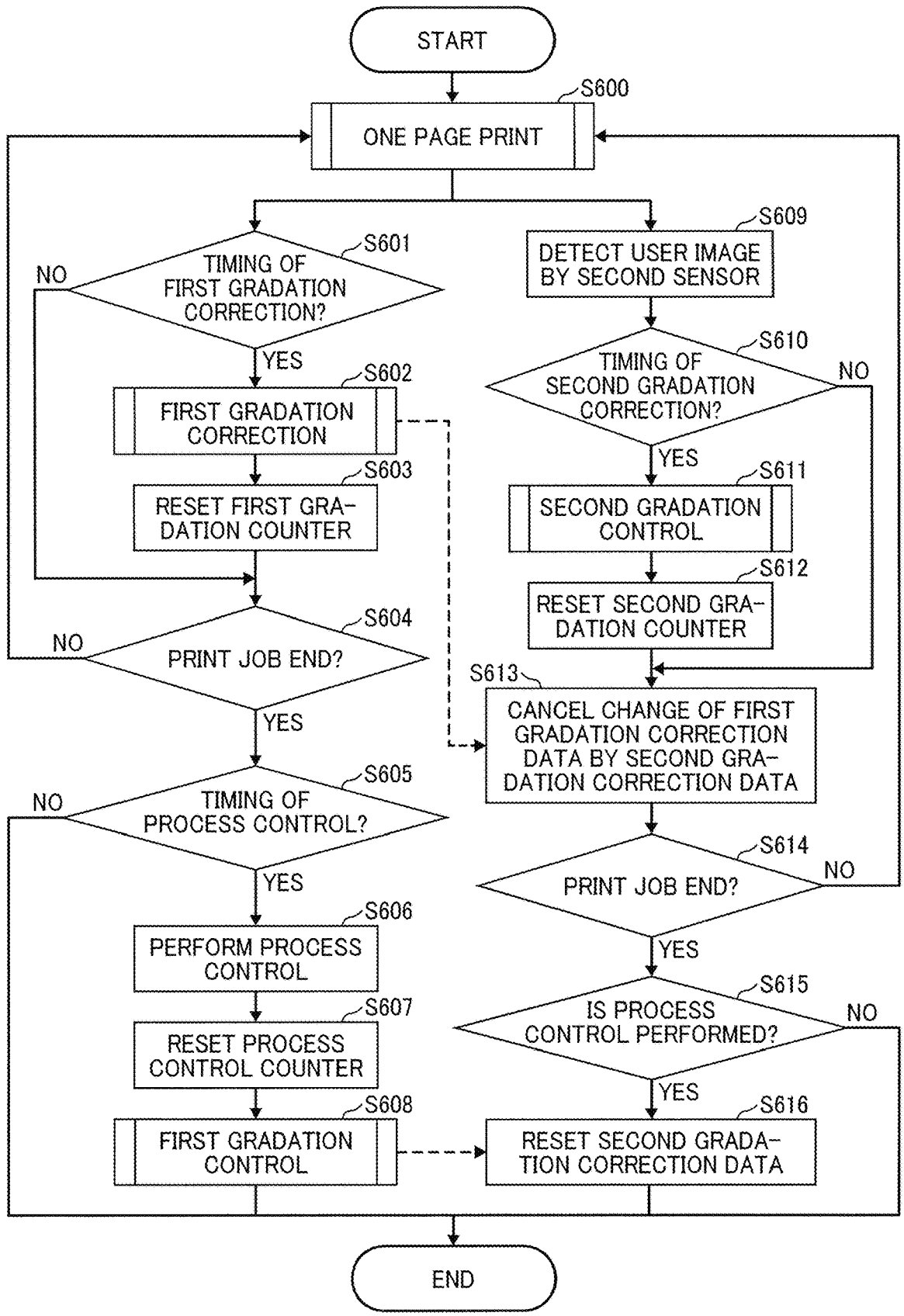
FIG. 6 is a flowchart illustrating a print job procedure executed by the printer in FIG. 1.

Next, in the printer 1 according to the present embodiment, a description is given of gradation correction control in consecutive image formation operations (print jobs) with reference to the flowchart in FIG. 6. First, the printer 1 executes single-page printing processing, which is image formation for one sheet (step S600).

Figure 7:
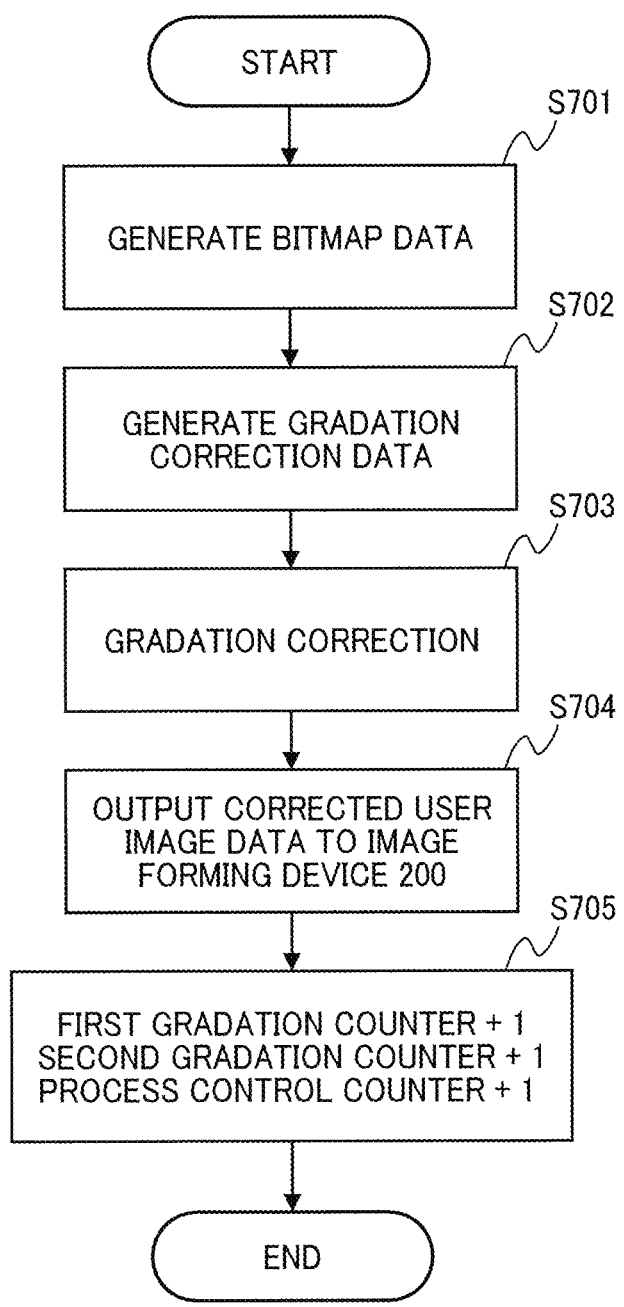
FIG. 7 is a flowchart illustrating a single-page printing procedure executed by the printer in FIG. 1.

A detailed description is given of the single-page printing processing in step S600 with reference to a flowchart illustrated in FIG. 7. As the image forming controller 100 accepts a print job from the outside, the job data processor 101 transfers job data to the RIP 102, and the RIP 102 generates and transfers bitmap data for one page to the print processor 103 (step S701). Subsequently, the gradation correction data generation unit 106 read the first gradation correction data and the second gradation correction data stored in the gradation correction data memory 105, generates and transfers gradation correction data to the print processor 103 (step S702).

The print processor 103 executes gradation correction based on the gradation correction data on the bitmap data and generates user image data (step S703). Then, the print processor 103 outputs the corrected user image data to the image forming device 200 (step S704). Subsequently, the image forming controller 100 updates various counters used in the latter stage processing (step S705), and the single-page printing processing ends.

Processing of generating gradation correction data in S702 is schematically described with reference to FIG. 14. As illustrated in image data 1031 indicating an example of a part of bitmap data in FIG. 14, a user image as an image formation target includes a large number of pixels with different image densities. When the image forming device 200 writes dots corresponding to an image density of each pixel in the image bearer, dither growth matrixes 1061 are used. The dither growth matrix 1061 defines what combination of dots to be written forms a predetermined image density. The dither growth matrix 1061 defines a rule to grow dots gradually corresponding to an image density so as to form a small dot relative to image data with a low density and form a large dot relative to image data with a high density.

Figure 14:
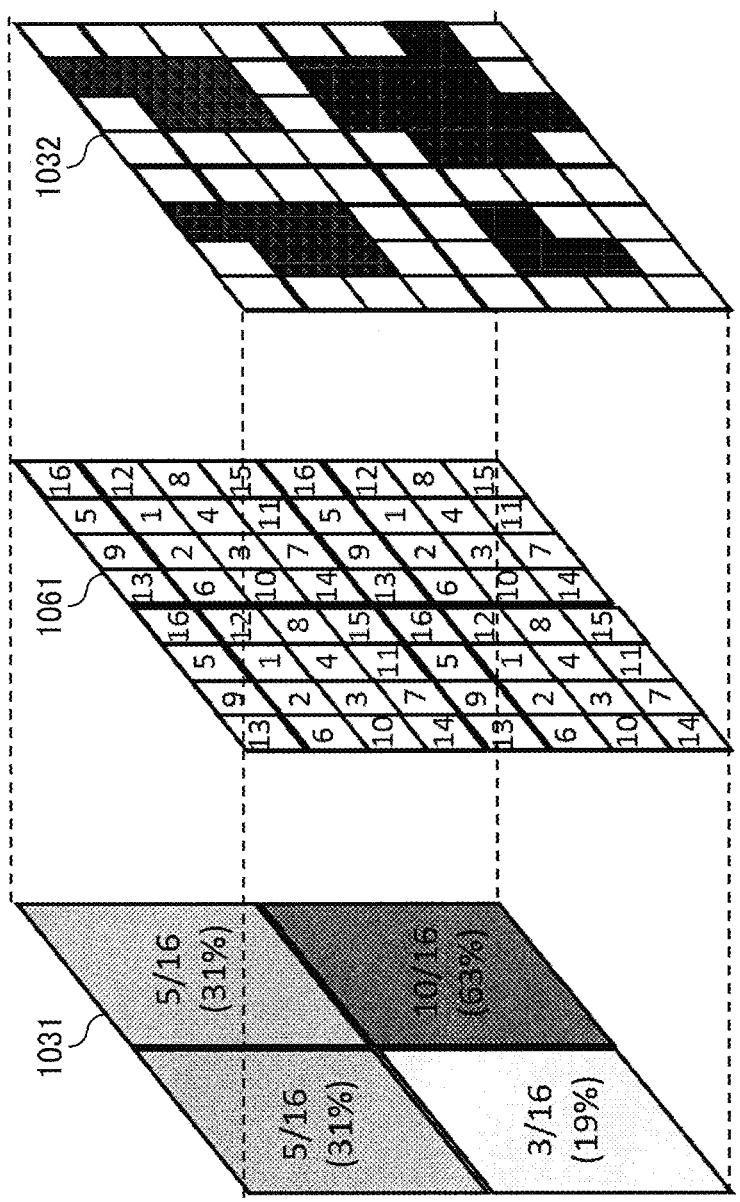
FIG. 14 is a schematic diagram illustrating processes of generating correction data to use for gradation correction executed by the printer in FIG. 1.

For example, as illustrated in FIG. 14, when image densities of image data 1031 in first and second quadrants are 31%, dots that are level 5 or less of 16 levels are filled in the dither growth matrix 1061. As a result, image data 1031 with high image density becomes large dots in the user image 1032.

The gradation correction using the gradation correction data corrects a threshold value of each dot in the dither growth matrix 1061.

The description continues with a return to FIG. 6. After the single-page printing processing, a processing relating to the first gradation correction and a processing relating to the second gradation correction are executed in parallel. Therefore, the first gradation correction and the second gradation correction are independently executed in consecutive printing. For convenience of description, each processing is ordered as follows. However, the processing relating to the first gradation correction and the processing relating to the second gradation correction are independently performed and do not have to be executed in the order as described below.

Following step S600, the printer 1 determines whether to execute the first gradation correction (step S601). A timing of the first gradation correction is determined based on whether the number of consecutive printing has exceeded 500 sheets since the previous first gradation correction. That is, the determination processing is based on whether a first gradation counter has exceeded 500. If the number of consecutive printing has not exceeded 500 (No in step S601), the process goes to step S604. In step S604, if the print job has not ended, the process returns to step S600. In step S601, if the number of consecutive printing since the previous first gradation correction has exceeded 500 (Yes in step S601), the printer 1 executes the first gradation correction (step S602).

Figure 8:
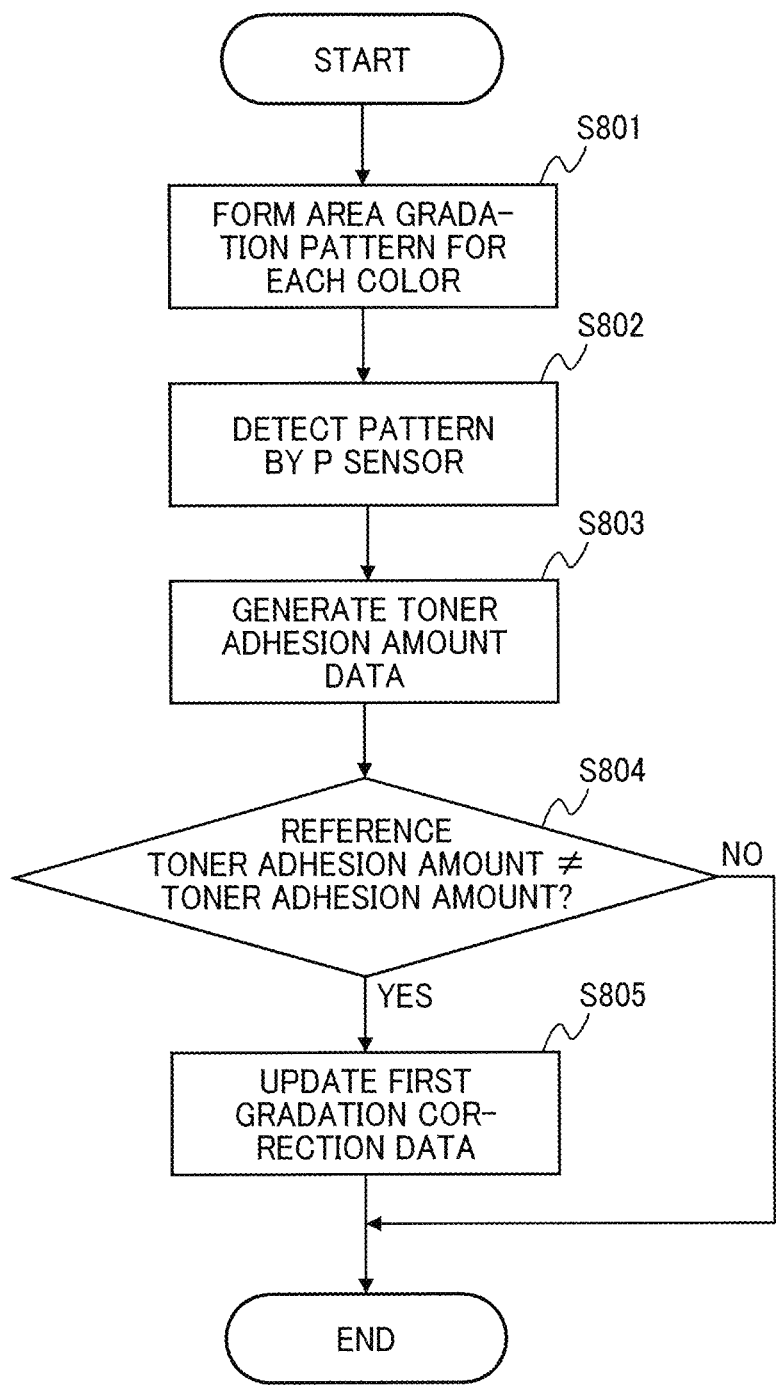
FIG. 8 is a flowchart illustrating a first gradation correction procedure executed by the printer in FIG. 1.

Here, a description is given of details of the first gradation correction with reference to FIG. 8. The image forming device 200 forms gradation patterns using area gradation method for respective colors on the conveyance belt 201 and transfers the gradation patterns to the secondary transfer belt 208 (step S801). The first detector 401 detects the gradation pattern and notifies the first gradation correction data generator 302 of a toner adhesion amount of the gradation pattern based on the detection result (step S802).

The first gradation correction data generator 302 generates toner adhesion amount data (step S803) and compares with a reference toner adhesion amount which is preliminarily stored (step S804). If the toner adhesion amount data generated in step S803 is different from the reference toner adhesion amount (Yes in step S804), the first gradation correction data generator 302 updates the first gradation correction data (step S805). Specifically, the gradation correction unit 300 stores the first gradation correction data based on the toner adhesion amount data generated in step S803, in the gradation correction data memory 105 via the gradation correction data notification unit 304 (step S805). As a result, the first gradation correction data is updated, and the process ends. If the toner adhesion amount data generated in step S803 is the same as the reference toner adhesion amount (No in step S804), the process ends without updating the first gradation correction data.

The description returns to FIG. 6. The gradation correction unit 300 resets the first gradation counter after generating the first gradation correction data (step S603). Then, if the print job has ended (Yes in step S604), the image forming controller 100 determines whether to perform the process control processing (step S605). A timing of the process control processing is determined based on whether the number of cumulative print pages has exceeded 5000 sheets since the previous process control processing. That is, the determination processing is based on whether a process control counter has exceeded 5000. If the number of cumulative print pages has not exceeded 5000 sheets (No in step S605), the print job ends.

If the number of cumulative print pages has exceeded 5000 sheets (Yes in step S605), the printer 1 performs the process control processing (step S606) and resets the process control counter (step S607). The printer 1 executes the first gradation correction in a state in which characteristics of image formation processing are changed by the process control processing (step S608).

Following step S600 described above, the second detector 402 reads a sheet on which a user image is formed in step S600 (step S609). The printer 1 determines whether to execute the second gradation correction (step S610). A timing of the second gradation correction is determined based on whether the number of consecutive print pages has exceeded 8 sheets since the previous second gradation correction. That is, the determination processing is based on whether a second gradation counter has exceeded 8. If the number of consecutive printing has not exceeded 8 sheets (No in step S610), the process goes to step S613. In step S610, if the number of consecutive printing has exceeded 8 sheets (Yes in step S610), the printer 1 executes the second gradation correction (step S611).

Figure 9:
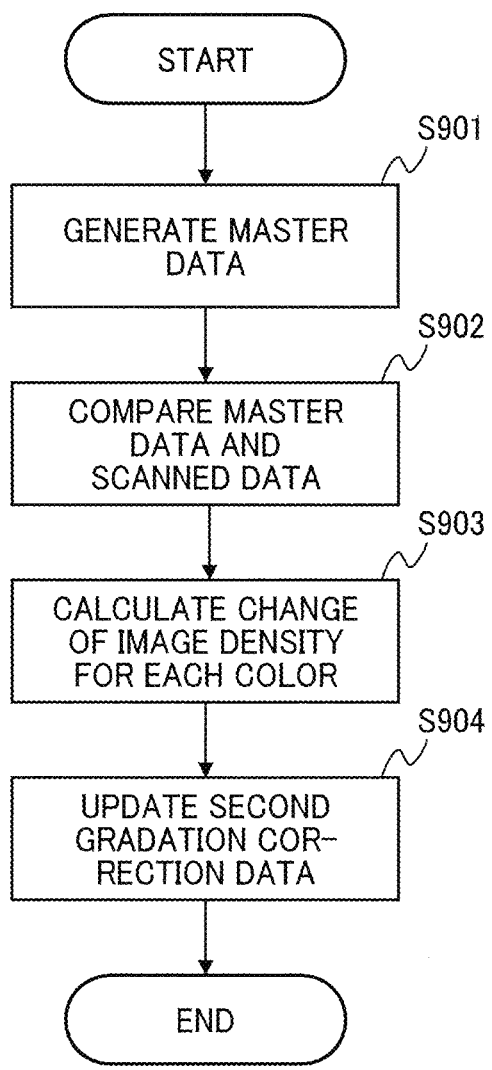
FIG. 9 is a flowchart illustrating a second gradation correction procedure executed by the printer in FIG. 1.

Here, a description is given of the second gradation correction in detail with reference to FIG. 9. The second gradation correction data generator 303 generates master data to be compared with scanned data, based on bitmap data received from the bitmap transmitter 104 (step S901). Then, the second gradation correction data generator 303 compares the user image scanned by the second detector 402 in step S609 (i.e., the scanned data) and the master data (step S902). The second gradation correction data generator 303 calculates change of image density of each color based on the comparison result (step S903). Based on the calculated change of image density, the second gradation correction data generator 303 generates the second gradation correction data to correct the change of image density and stores the second gradation correction data in the gradation correction data memory 105 via the gradation correction data notification unit 304 (step S904). As a result, the second gradation correction data is updated.

The description returns to FIG. 6. The gradation correction unit 300 resets the second gradation counter after generating the second gradation correction data (step S612).

Subsequently, the gradation correction unit 300 cancels change of the first gradation correction data by the second gradation correction data generated by the second gradation correction in step S611 (step S613). The change of the first gradation correction data is change from the previous first gradation correction data to the first gradation correction data generated by the first gradation correction in step S602. As a result, even if the first gradation correction and the second gradation correction are used in combination, the gradation correction unit 300 can adjust the gradation correction data so that a total gradation amount is not changed.

If the print job has not ended (No in step S614), the process returns to step S600. If the print job has ended (Yes in step S614), the printer 1 determines whether the process control processing has already been performed (step S615).

If the process control processing has been performed (Yes in step S615), the gradation correction unit 300 resets the second gradation correction data, and the printer 1 executes the gradation correction with only the first gradation correction data (step S616). If the process control processing has not been performed (No in step S615), the print job ends.

Figure 10:
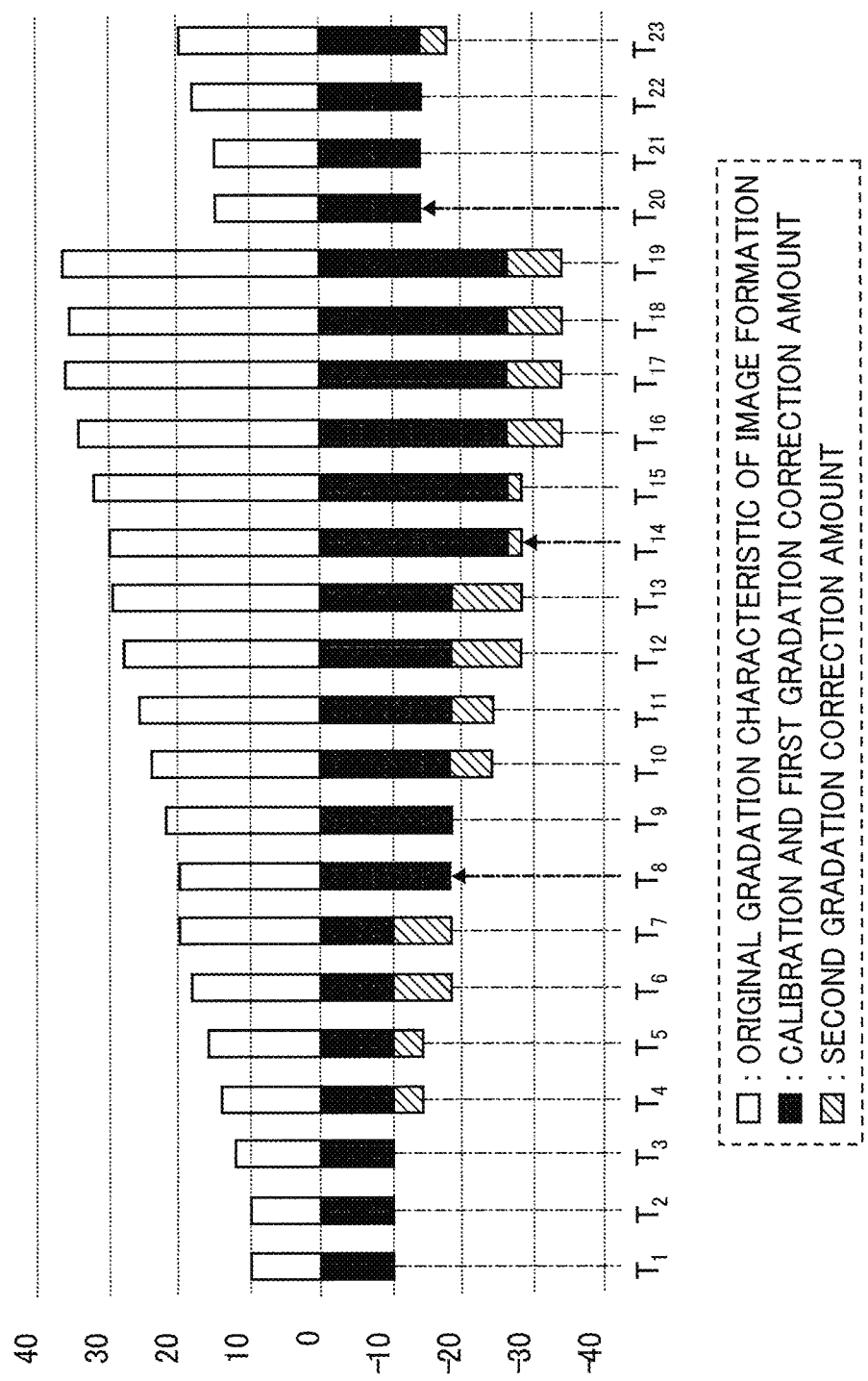
FIG. 10 is a graph illustrating changes in the first and second gradation correction data of the print job performed by the printer in FIG. 1.

The flow of the processing described above is described focusing on changes in an amount (correction amount) to be corrected by the generated gradation correction data. FIG. 10 is a graph illustrating an example of changes in the first and second gradation correction data of the print job performed by the printer in FIG. 1. A horizontal axis of the graph represents the number of consecutive print pages (cumulative print pages). A positive vertical axis of the graph represents original characteristics (gradation characteristics) in image formation of the printer 1. A negative vertical axis of the graph represents correction amounts of the first gradation correction and the second gradation correction. Note that, for convenience of description, the horizontal axis is marked with symbols indicating timing, such as T1 and T2.

First, colorimetry calibration is performed (T1). As a result, the first gradation correction data is generated to correct the original characteristics of the printer 1, and the printer 1 becomes ready for use.

Consecutive printing starts (T2). Then, the original characteristics of the printer 1 change. For example, the image density is likely to become higher (T3). Therefore, the second gradation correction is executed at a predetermined timing (T4). As a result, characteristics of the printer 1 are corrected.

After T4, similarly, the original characteristics of the printer 1 change (T5), the second gradation correction is executed at a predetermined timing (T6), and the second gradation correction data is updated as required. Accordingly, the updated second gradation correction data can correct the original characteristics.

After that, the consecutive printing continues (T7). The first gradation correction is executed at a predetermined time (T8). At that time, a correction amount by the second gradation correction data already used and a correction amount by the present first gradation correction data overlap. If the overlapped correction amount is applied, the correction amounts are different in the printing result before and after the correction. As a result, color change occurs. Therefore, as step S613 described above, an increment of the first gradation correction data is canceled by the correction amount of the second gradation correction data at T8, thereby adjusting correction amount so as not to change the total correction amount. Thus, even if the first gradation correction and the second gradation correction are used in combination, the color change does not occur.

Then, the second gradation correction is executed at T10 and T12, and the second gradation correction data is updated at T10 and T12. After that, when the first gradation correction is executed at T14, a correction amount corresponding to the change of correction amount between the previous first gradation correction and the present first gradation correction is canceled by a correction amount of the second gradation correction.

Then, the print job ends (T18), and the process control processing is performed (T19). After the process control processing, the original characteristics of the printer 1 approach the initial state at the colorimetry calibration. Accordingly, the correction amount by the first gradation correction data and the second gradation correction data used until then becomes too large. Therefore, the first gradation correction (see step S608 in FIG. 6) generates the first gradation correction data at the time of the process control processing, and the gradation correction can be executed using the first gradation correction data. The second gradation correction data is reset (see step S616 in FIG. 6).

By controlling the gradation correction as described above, even if updating of the second gradation correction stops when the print job is switched to a print job with small amount of color data, control is smoothly shifted to the gradation correction by the first gradation correction data. As a result, for example, the color change before and after switching is reduced as compared with a case of control switched from a state to which only the second gradation correction is applied, to a state to which only the first gradation correction is applied.

Note that, a case in which the update of the second gradation correction data stops is, for example, the print job with 500 pages in which 1 to 300 pages include many pictures having various colors, and 301 to 500 pages mainly include characters (mostly black and partially red). That is the case in which types of detectable colors are reduced. In this case, the update of the second gradation correction data is stopped after 301 page.

Further, when the print job is consecutively switched from a print job with sheet thickness of 200 gram per square meter (gsm) to a print job with sheet thickness of 70 gsm (especially in the duplex printing), the second detector 402 recognizes a reverse side image as viewed from the obverse side in the print job with sheet thickness of 70 gsm (i.e., visibility of reverse side image), thereby affecting the detection result. Therefore, color change data is not acquired, and the update of the second gradation correction data is stopped.

Next, a description is given of an image forming apparatus according to another embodiment of the present disclosure. The gradation correction controller 301 included in the printer 1 described above controls the gradation correction based on data relating to the print job notified by the print processor 103. The gradation correction controller 301 according to the present embodiment does not execute the second gradation correction in a case of duplex printing and sheet thickness (basis weight) that is a predetermined thickness threshold value or less.

Figure 11A:
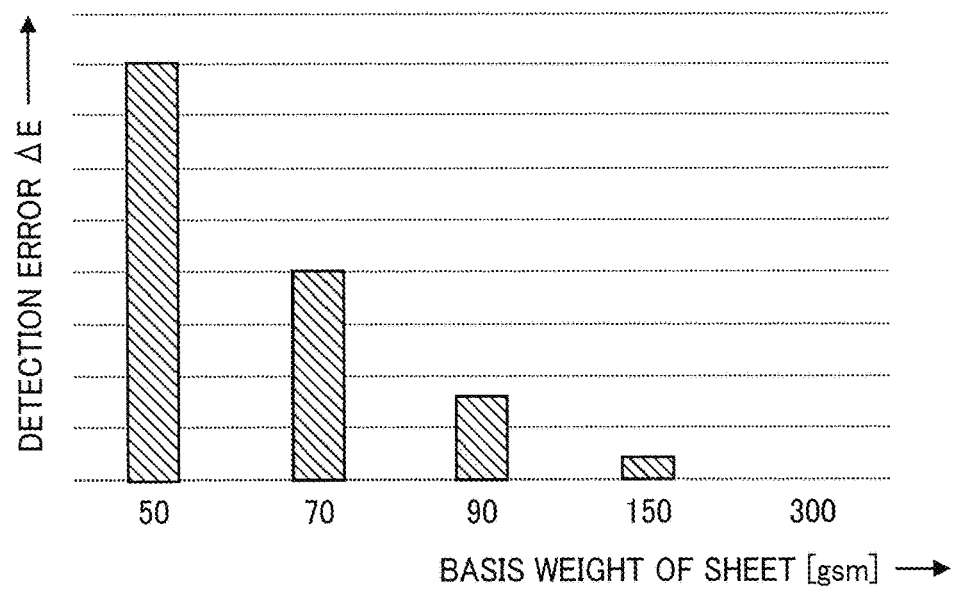
FIGS. 11A and 11B are graphs illustrating a relation between a thickness of a recording medium and image detection accuracy of the print job executed by the printer in FIG. 1.
Figure 11B:
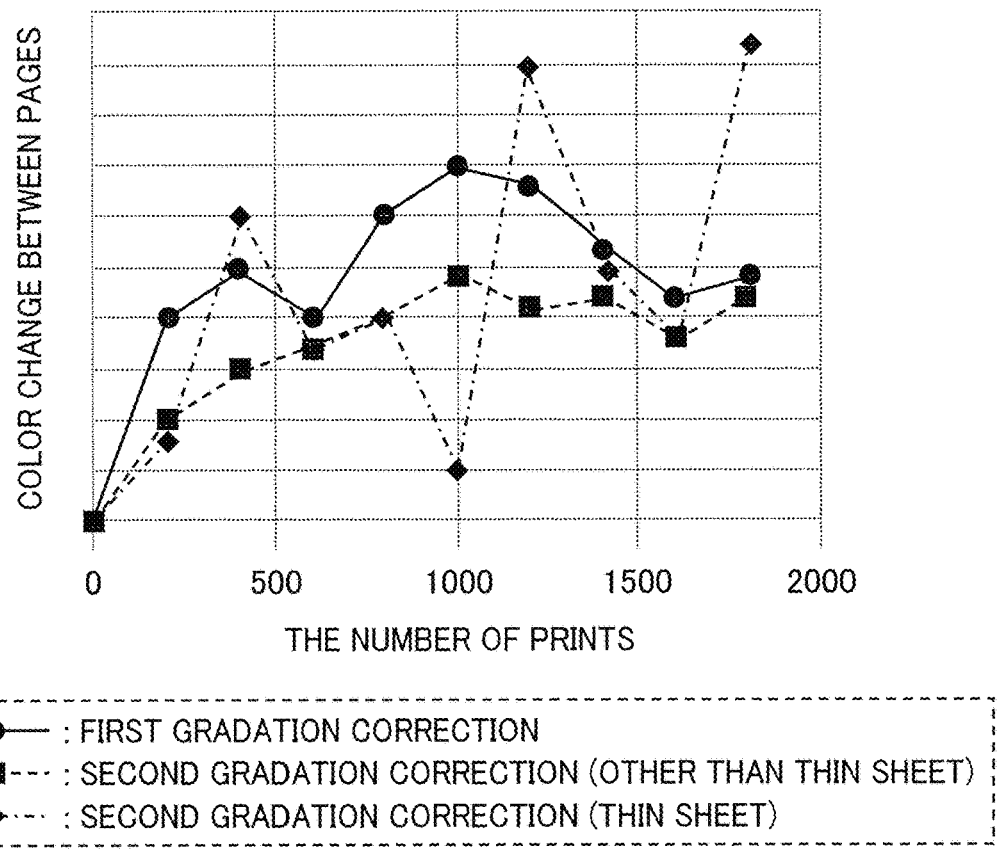

FIG. 11A is a graph illustrating a relation between a thickness (basis weight) of a sheet and image detection error ΔE of the obverse side image due to the visibility of the reverse side image. FIG. 11B is a graph illustrating a relation between a thickness (basis weight) of a sheet, accuracy of the first gradation correction and the second gradation correction, and the number of print pages.

As illustrated in FIG. 11A, as the sheet thickness (basis weight) becomes larger, the detection error ΔE becomes smaller. That is, the sheet becomes thinner, the detection error ΔE extremely becomes larger. Further, as illustrated in FIG. 11B, a thin sheet especially causes large color change between pages in the second gradation correction.

Therefore, when basis weight of the sheet notified to the gradation correction controller 301 is equal to or less than the predetermined thickness threshold value (e.g., 80 gsm), and print job is duplex printing, the gradation correction controller 301 according to the present embodiment stops updating the correction amount in the second gradation correction during the print job.

As described above, the first gradation correction is executed irrespective of whether the second gradation correction is valid or invalid. Therefore, while printing a job under certain predetermined conditions, the first gradation correction continues functioning even if the second gradation correction stops. The second gradation correction has higher accuracy than the first gradation correction without the visibility of reverse side image. However, in a case of the thin sheet and duplex printing, the color change between pages in the second gradation correction gets worse due to detection error by the visibility of reverse side image. Therefore, the gradation correction is executed by the first gradation correction, thereby improving color stability even in print processing on the thin sheet. As a result, the gradation correction suitable for the type of sheet can be executed. Therefore, color stability can be stable in print jobs for any type of sheet.

Next, a description is given of an image forming apparatus according to yet another embodiment of the present disclosure. The gradation correction controller 301 included in the printer 1 described above controls the gradation correction based on data relating to the print job notified by the print processor 103. The gradation correction controller 301 according to the present embodiment controls so as not to execute the second gradation correction when a length of the sheet in the conveyance direction is a predetermined length threshold value or less.

When size data of the sheet used in the print job is notified to the gradation correction controller 301, and the size in the conveyance direction of the sheet is equal to or less than the predetermined length threshold value (e.g., 300 mm), the gradation correction controller 301 stops updating correction amount by the second gradation correction (i.e., the second gradation correction data) while printing the print job.

Figure 12A:
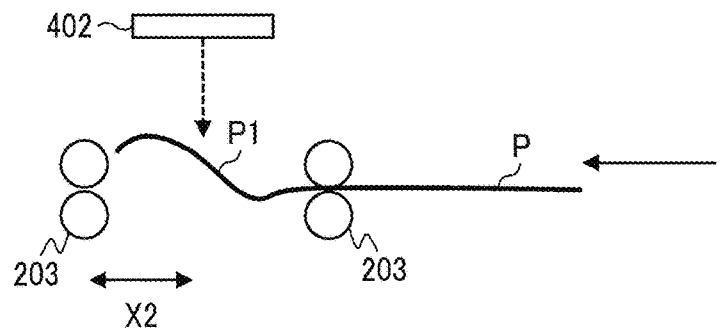
FIGS. 12A to 12D are schematic diagrams illustrating a relation between a length of a recording medium and image detection of the print job executed by the printer in FIG. 1.
Figure 12B:
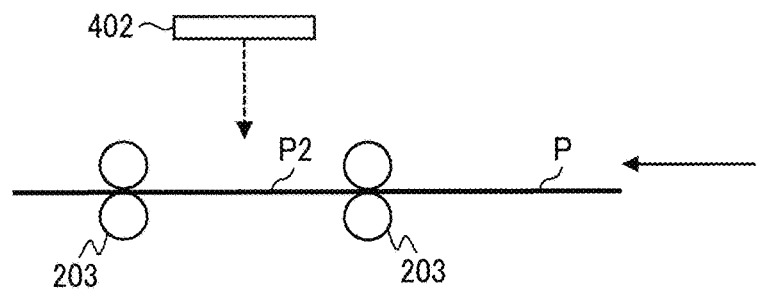
Figure 12C:
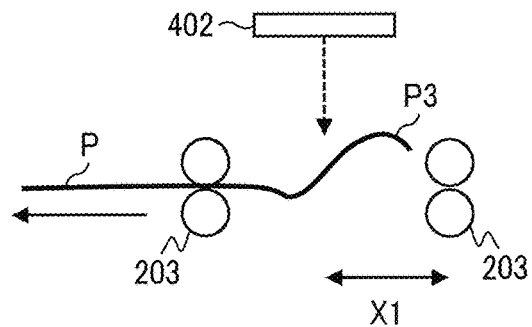

FIGS. 12A and 12C illustrate states in which the second detector 402 does not reliably read a user image, and FIG. 12B illustrates a state in which the second detector 402 can reliably read the user image, in the length in the conveyance direction of the sheet. As illustrated in FIGS. 12A and 12C, in a state in which the conveyance roller pairs 203 do not nip both ends of the sheet, the end of the sheet is twisted, causing the second detector 402 not to reliably read the user image. The second detector 402 can read the user image in the state illustrated in FIG. 12B.

Figure 12D:
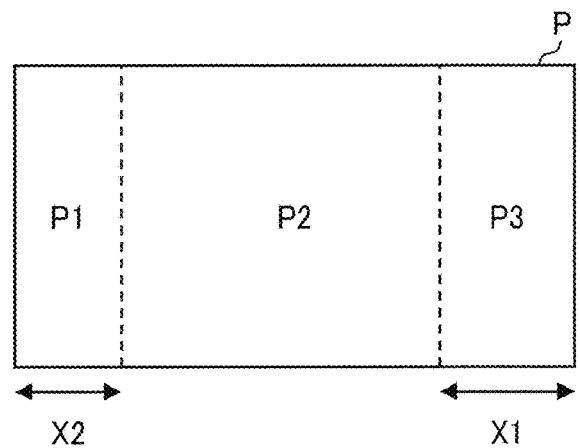

Therefore, as illustrated in FIG. 12D, the detection result of the user image is not stable in areas P1 and P3 of the sheet. The area P3 is a portion of the sheet from a trailing end to a position corresponding to a distance X1 from the trailing end. The area P1 is a portion of the sheet from a leading end to a position corresponding to a distance X2 from the leading end.

Figure 13A:
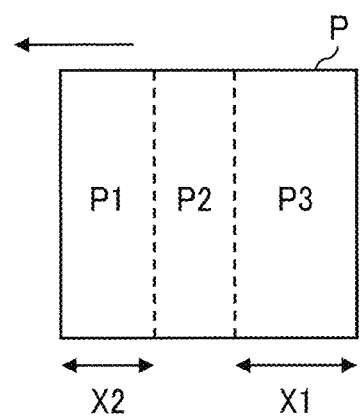
FIGS. 13A and 13B are schematic diagrams illustrating a relation between lengths of recording media and image detection accuracy of the print job executed by the printer in FIG. 1.
Figure 13B:
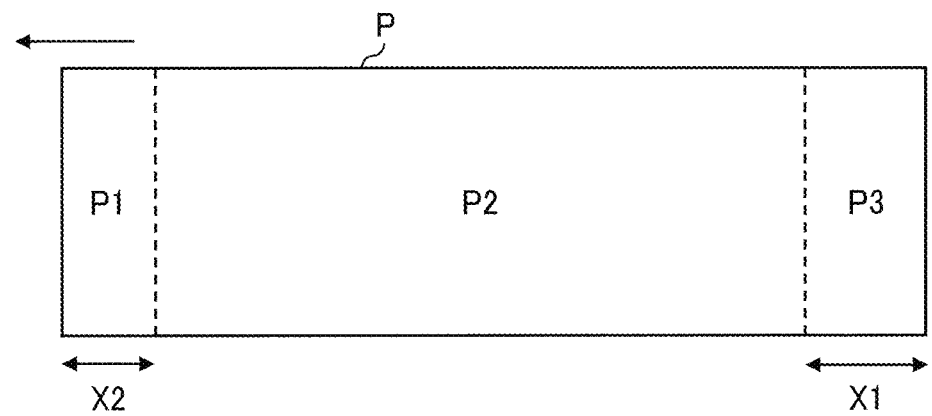

These areas P1 and P3, in which the detection error is large (or the detection is unstable), are defined by the distance between the conveyance roller pairs 203 and the second detector 402, irrespective of the size of the sheet. Therefore, as illustrated in FIG. 13A, when the sheet size is small, the areas P1 and P3, in which the detection error is large, occupies a large part of the sheet, thereby reducing the detection accuracy in an entire page. On the contrary, as illustrated in FIG. 13B, when the sheet size is large, the area P2, in which the detection error is small, occupies a large part of the sheet.

Therefore, a certain sheet size as the predetermined length threshold value with which the area P2 becomes small is defined. Since accuracy of the second gradation correction is reduced when the notified sheet size of the print job is less than the predetermined length threshold value, the second gradation correction is stopped. In this case, the gradation correction control by the first gradation correction is executed. As a result, color stability is improved in the print job with such a sheet size.

According to the above-described embodiments of the present disclosure, the printer 1 as an image forming apparatus can reduce color change between pages during consecutive printing. Specifically, multiple sensors detect color change between pages, and the printer 1 can control which sensor's detection result is prioritized in gradation correction control based on at least one of a characteristic of the recording medium (e.g., the sheet size, thickness, and type) and a characteristic of the image data (e.g., color data is abundant or poor).

In other words, when consecutive image formation operations are performed, gradation correction control based on a pattern image formed on an image bearer and gradation correction control based on the characteristic of the image acquired by reading a user image formed on a recording medium can be appropriately combined.

According to the printer 1 described in the above embodiments, gradation correction data is updated during consecutive printing as required, thereby reducing color change between pages. Specifically, multiple sensors detect color change between pages, and gradation correction data corresponding to the detection results are separately retained. The printer 1 generates gradation correction data combining multiple gradation correction data and applies to print image data.

Further, the printer 1 determines which sensor's detection result is prioritized in the multiple sensors. When the printer 1 acquires the sensor's detection result that is not prioritized, gradation correction data not to be prioritized is updated, and simultaneously, reverse correction to cancel the gradation correction data not to be prioritized is reflected on the gradation correction data of the sensor to be prioritized. As a result, in the normal print job, appropriate gradation correction control is prioritized, thereby attaining high accuracy of the gradation correction. Further, in the print job in which color data of the user image is poor, appropriate gradation correction control is prioritized, thereby reducing color change between pages.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus comprising:
   a transferor;
   a first detector configured to detect an image formed on the transferor;
   a second detector configured to detect an image formed on a recording medium; and
   circuitry configured to:
   generate first gradation correction data based on a detection result obtained by the first detector;
   generate second gradation correction data based on a detection result obtained by the second detector;
   control gradation correction of the image formed on the recording medium, using the first gradation correction data and the second gradation correction data; and
   prioritize one of the first gradation correction data and the second gradation correction data based on at least one of a characteristic of the recording medium and a characteristic of the image, in gradation correction during consecutive printing in which images are consecutively formed on recording media.

2. The image forming apparatus according to claim 1, wherein the circuitry is configured to:
   update the first gradation correction data based on at least one of the characteristic of the recording medium and the characteristic of the image; and
   reflect reverse correction that cancels a change of the first gradation correction data by the second gradation correction data.

3. The image forming apparatus according to claim 1, wherein the characteristic of the recording medium is at least one of a length of the recording medium in a conveyance direction of the recording medium and a thickness of the recording medium.

4. The image forming apparatus according to claim 3, wherein the circuitry is configured to prioritize the first gradation correction data and execute the gradation correction when the thickness of the recording medium is a predetermined thickness threshold value or less and the consecutive printing is performed in duplex printing.

5. The image forming apparatus according to claim 3, wherein the circuitry is configured to prioritize the first gradation correction data and execute the gradation correction when the length of the recording medium is a predetermined length threshold value or less.

* * * * *